United States Patent [19]

Flotow et al.

[11] Patent Number: 4,940,126
[45] Date of Patent: Jul. 10, 1990

[54] DIAPHRAGM SPRING CLUTCH

[75] Inventors: Richard A. Flotow, Butler; William H. Sink, Auburn; Martin J. Hermanns, Ft. Wayne, all of Ind.

[73] Assignee: Dana Corporation, Toledo, Ohio

[21] Appl. No.: 166,862

[22] Filed: Mar. 11, 1988

[51] Int. Cl.⁵ .............................................. F16D 13/44
[52] U.S. Cl. .............................. 192/89 B; 192/70.27; 192/98
[58] Field of Search ................. 192/89 B, 70.27, 70.3, 192/98, 99 A

[56] References Cited

U.S. PATENT DOCUMENTS

| | | |
|---|---|---|
| 1,197,245 | 9/1916 | White . |
| 1,571,015 | 1/1926 | Leighton . |
| 2,010,181 | 8/1935 | Fink . |
| 2,045,557 | 6/1936 | Almen et al. . |
| 2,073,146 | 3/1937 | Gardiner . |
| 2,126,149 | 8/1938 | Spase . |
| 2,171,908 | 9/1939 | Beringer . |
| 2,445,638 | 7/1948 | Saks . |
| 2,641,344 | 6/1953 | Banker . |
| 3,018,863 | 1/1962 | Elfes . |
| 3,060,759 | 10/1962 | Van Der Brugghen . |
| 3,160,253 | 12/1964 | Maurice . |
| 3,212,612 | 10/1965 | Sink .................................. 192/89 B |
| 3,237,739 | 3/1966 | Pritchard ......................... 192/89 B |
| 3,392,812 | 7/1968 | Kaptur et al. . |
| 3,754,628 | 8/1973 | Hildebrand ..................... 192/111 B |
| 3,758,094 | 9/1973 | Crutchley et al. ................. 267/162 |
| 3,791,499 | 2/1974 | Ryan ................................. 192/70.27 |
| 4,300,669 | 11/1981 | Browne ............................ 192/89 B |
| 4,332,314 | 6/1982 | Flotow ............................. 192/89 B |
| 4,671,398 | 6/1987 | Scheer ............................. 192/89 B |
| 4,678,071 | 7/1987 | Ball et al. ......................... 192/89 B |
| 4,720,002 | 1/1988 | Kitano et al. .................... 192/70.29 |
| 4,754,860 | 7/1988 | Fukutake et al. .................. 192/70.3 |

FOREIGN PATENT DOCUMENTS

| | | | |
|---|---|---|---|
| 218801 | 12/1961 | Austria .............................. 192/89 B |
| 940011 | 6/1962 | Fed. Rep. of Germany .... 192/89 B |
| 1272645 | 7/1968 | Fed. Rep. of Germany .... 192/89 B |
| 1943336 | 8/1978 | Fed. Rep. of Germany .... 192/89 B |
| 2820412 | 11/1978 | Fed. Rep. of Germany .... 192/89 B |
| 994283 | 6/1965 | United Kingdom . |
| 1327774 | 8/1973 | United Kingdom . |
| 1458179 | 8/1976 | United Kingdom . |
| 2083578 | 9/1980 | United Kingdom . |
| 2180017 | 8/1986 | United Kingdom . |
| 2186926 | 2/1987 | United Kingdom . |
| 2187241 | 2/1987 | United Kingdom . |

Primary Examiner—Leslie A. Braun
Assistant Examiner—Andrea Pitts

[57] ABSTRACT

An improved diaphragm spring clutch is disclosed. The clutch includes a generally annular cover having a shoulder formed thereabout on a forwardly facing surface. A flat, angled bearing surface is formed throughout an inner radial portion of the shoulder. A plurality of forwardly facing slots are also formed about the shoulder. The slots are spaced equidistantly and extend radially outwardly from the bearing surface through the shoulder. The clutch further includes a generally hollow cylindrical release retainer. The retainer terminates in a generally flat end surface which faces rearwardly. A plurality of rearwardly facing recessed areas are formed in the end surface of the retainer. An annular diaphragm spring is provided within the clutch. The diaphragm spring includes an outer peripheral surface, which engages the forwardly facing bearing surface of the cover, and an inner peripheral surface, which engages the rearwardly facing end surface of the retainer. The diaphragm spring pilots the retainer co-axially relative to the cover. The diaphragm spring further includes a plurality of radially outwardly extending tangs formed about the outer peripheral surface thereof and a plurality of radially inwardly extending tangs formed about the inner peripheral surface thereof. The outer tangs are provided to cooperate with the slots formed in the shoulder of the cover, while the inner tangs are provided to cooperate with the recessed areas formed in the end surface of the retainer.

6 Claims, 3 Drawing Sheets

DIAPHRAGM SPRING CLUTCH

BACKGROUND OF THE INVENTION

The present invention relates in general to vehicle clutches and in particular to improved structure for a diaphragm spring clutch.

Clutches are well known which are adapted to selectively connect a driving member to a driven output member, typically for together within a vehicle. Within such a clutch, some sort of spring mechanism is typically used to the components thereof toward an engaged position, the output member is frictionally engaged by the input member. Frequently, a plurality of coil springs is provided for this purpose. Such coil springs are generally disposed in pairs about the axis of rotation of the clutch between a cover for the clutch and an axially movable release retainer. The combined force generated by these springs urges the retainer away from the cover toward a flywheel. The cover and the flywheel are connected together and are rotatably driven by the engine of the vehicle.

Between the retainer and the flywheel, a pressure plate is disposed. The pressure plate is axially movable with the retainer by means of a lever system. A driven disc is interposed between the pressure plate and the flywheel. The driven disc is connected for rotation with an output shaft. The springs cause the driven disc to be frictionally engaged between the pressure plate and the flywheel until the urging thereof is overcome by a releasing force applied by the operator of the vehicle through a conventional mechanism. The releasing force moves the retainer and the pressure plate away from the driven disc, thereby releasing the frictional engagement thereof.

The plurality of coil springs may be replaced by a single diaphragm spring, also known as a Belleville spring. The diaphragm spring is formed generally in the shape of an angled annular washer. The diaphragm spring is disposed between the cover and the release retainer of the clutch, as are the coil springs described above, and functions in a similar manner to urge the components of the clutch toward the engaged position The use of a diaphragm spring is desirable because it reduces the number of parts in the clutch. The use of a diaphragm spring is also desirable because the load/deflection characteristics thereof can be adjusted.

SUMMARY OF THE INVENTION

The present invention relates to an improved structure for a diaphragm spring clutch. The clutch includes a generally annular cover having a shoulder formed thereabout on a forwardly facing surface. A flat, angled bearing surface is formed throughout an inner radial portion of the shoulder. A plurality of forwardly facing slots are also formed about the shoulder. The slots are spaced equidistantly and extend radially outwardly from the bearing surface through the shoulder. The clutch further includes a generally hollow cylindrical release retainer. The retainer terminates in a generally flat end surface which faces rearwardly. A plurality of rearwardly facing recessed areas are formed in the end surface of the retainer. An annular diaphragm spring is provided within the clutch. The diaphragm spring includes an outer peripheral surface, which engages the forwardly facing bearing surface of the cover, and an inner peripheral surface, which engages the rearwardly facing end surface of the retainer. The diaphragm spring pilots the retainer co-axially relative to the cover. The diaphragm spring further includes a plurality of radially outwardly extending tangs formed about the outer peripheral surface thereof and a plurality of radially inwardly extending tangs formed about the inner peripheral surface thereof. The outer tangs are provided to cooperate with the slots formed in the shoulder of the cover, while the inner tangs are provided to cooperate with the recessed areas formed in the end surface of the retainer Such cooperation prevents the diaphragm spring from rotating relative to the cover and the retainer.

It is an object of the present invention to provide an improved structure for a diaphragm spring clutch.

It is another object of the present invention to provide a diaphragm spring within such a clutch with a plurality of radially outwardly extending tangs, which outwardly extending tangs are adapted to cooperate with a corresponding plurality of slots formed on a shoulder of a cover of the clutch.

It is a further object of the present invention to provide a diaphragm spring within such a clutch with a plurality of radially inwardly extending tangs, which inwardly extending tangs are adapted to cooperate with a corresponding plurality of recessed areas formed on an end surface of a release retainer of the clutch.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
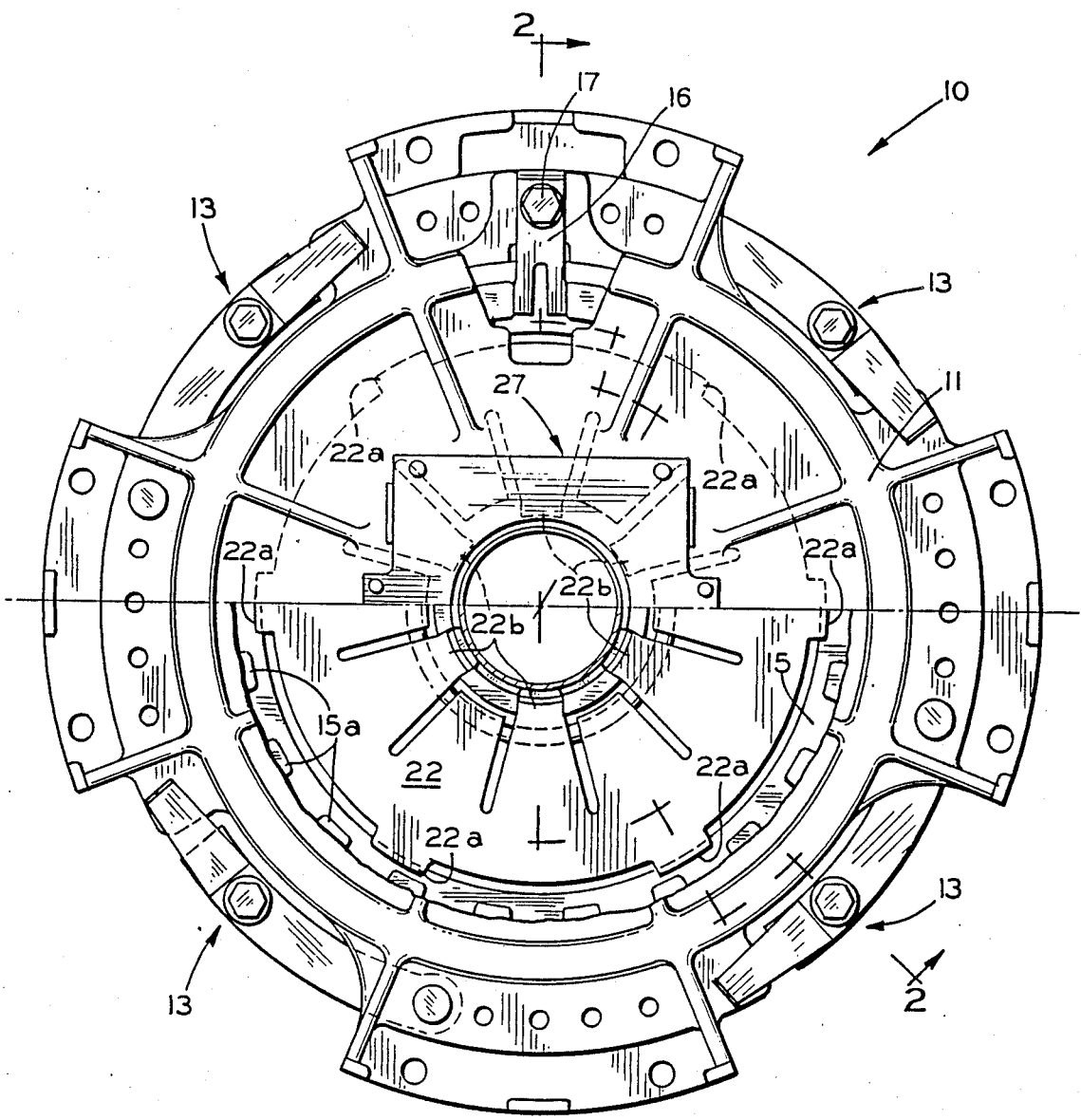
FIG. 1 is a facing end elevational view, partially broken away, of a clutch cover assembly in accordance the present invention.
Figure 2:
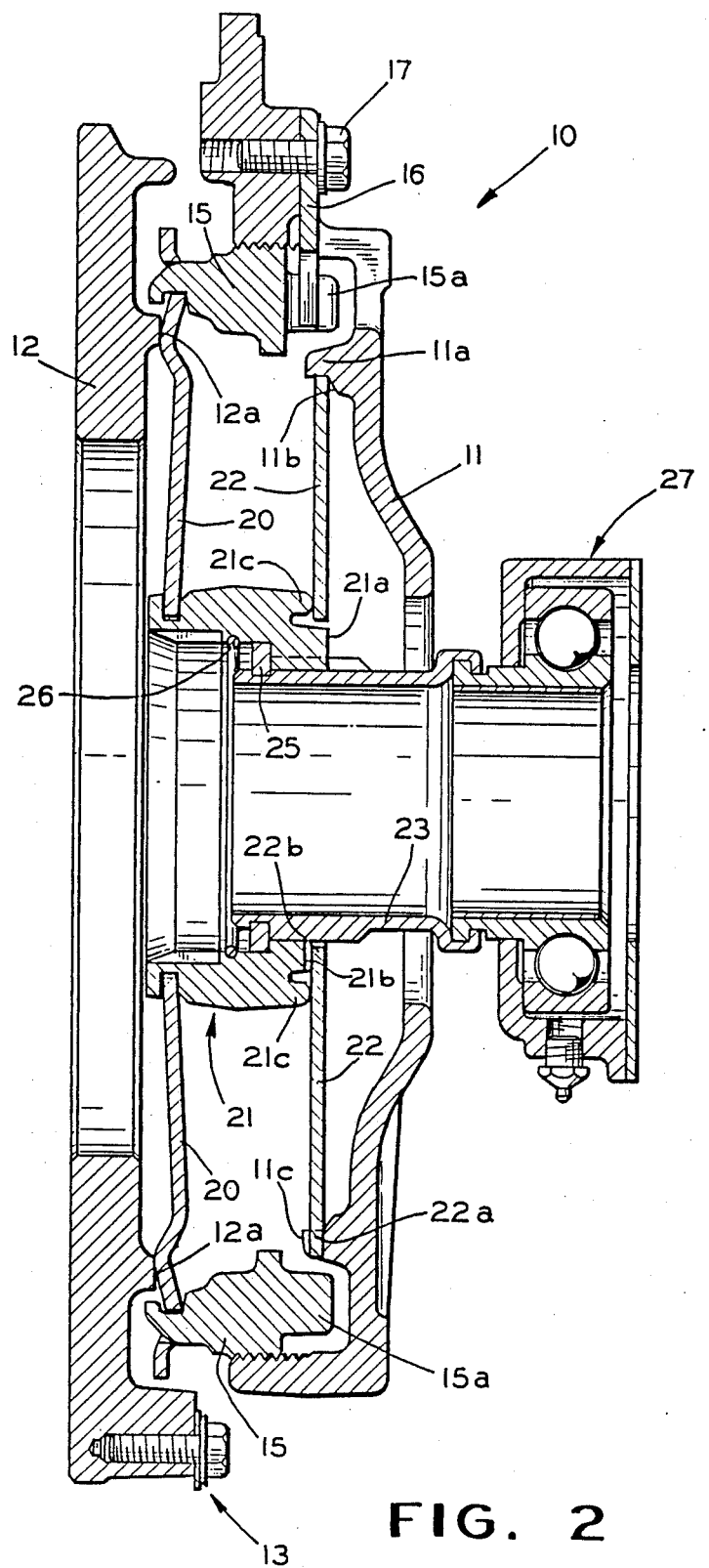
FIG. 2 sectional elevational view of the clutch cover along line 2—2 of FIG. 1.

Referring now to the drawings, there is illustrated in FIGS. 1 and 2 a clutch cover assembly, indicated generally at 10, in accordance with the present invention. The assembly 10 includes a cover 11 which is adapted to be driven by a flywheel (not shown) in a conventional manner for rotation therewith about a longitudinal axis. The structure of the cover 11 will be described in greater detail below. An annular pressure plate 12 is located forwardly of the cover 11. As used herein, the term "forwardly" indicates an axial direction extending from right to left in FIG. 2, while the term "rearwardly" indicates the opposite axial direction. The pressure plate 12 is connected to the cover 11 by a plurality of conventional drive strap assemblies, indicated generally at 13. Alternatively, a conventional plurality of spaced lug and slot arrangements (not shown) may be used to connect the cover 11 to the pressure plate 12. In either event, the cover 11 rotatably drives the pressure plate 12, while allowing the pressure plate 12 to move axially relative to the cover 11, as is well known in the art.

The clutch cover assembly 10 may include an adjusting ring, as shown at 15 in FIGS. 1 and 2. The adjusting ring 15 is conventional in the art and includes a radial outer threaded surface which is adapted to cooperate with a radial inner threaded surface formed on the cover 11. Rotation of the adjusting ring 15 relative to the cover 11 causes axial movement of the adjusting ring 15 in either the forward or rearward direction. The illustrated adjusting ring 15 is of the manual type, including a plurality of upstanding lugs 15a formed thereon. A lock strap 16 is secured to the cover 11 by a bolt 17 so as to maintain the adjusting ring 15 in a desired rotational position relative to the cover 11. The structure and operation of the manual adjusting ring 15 is described more fully in U.S. Pat. No. 4,285,424, the disclosure of which is incorporated herein by reference. If desired, the clutch cover assembly 10 may be of the non-adjustable type, wherein no adjusting ring is provided. The structure and operation of the non-adjustable clutch cover assembly is described more fully in U.S. Pat. No. 4,332,314, the disclosure of which is also incorporated herein by reference.

A plurality of conventional levers 20 are provided within the clutch cover assembly 10. The levers 20 extend generally radially outwardly from the axis of rotation of the clutch cover assembly 10 and are spaced equidistantly thereabout. The outermost ends of the levers 20 have slots formed therethrough to receive respective projections formed on the adjusting ring 15. The radial innermost ends of the levers 20 are received within a peripheral groove formed in a release retainer, indicated generally at 21. The retainer 21 is disposed co-axially about the axis of rotation and is permitted to move a limited distance therealong. The structure of the retainer 21 is described in greater detail below.

Between their radial outermost and innermost ends, the levers 20 engage an annular shoulder 12a formed on the pressure plate 12. As is known in the art (see, for example, U.S. Pat. No. 4,157,749, the disclosure of which is hereby incorporated by reference), axial movement of the retainer 21 causes the levers 20 to pivot about the projections of the adjusting ring 15, thereby causing axial movement of the pressure plate 12. When the retainer 21 is moved rearwardly toward the cover 11, the pressure plate 12 is also moved rearwardly. Thus, the pressure plate 12 is moved away from the flywheel to a disengaged position, wherein a driven disc (not shown) located between the pressure plate 12 and the flywheel is not frictionally engaged. When the retainer 21 is moved forwardly away from the cover 11, the pressure plate 12 is also moved forwardly toward the flywheel to an engaged position, wherein the driven disc is frictionally engaged.

A diaphragm spring 22 is provided within the clutch cover assembly 10. As best shown in FIGS. 1 and 2, the diaphragm spring 22 is shaped generally in the form of an annular Belleville washer. The diaphragm spring 22 includes a radial outer peripheral surface. A plurality of outer tangs 22a are formed integrally with the outer peripheral surface and extend radially outwardly therefrom. The diaphragm spring 22 further includes a radial inner peripheral surface. A plurality of inner tangs 22b are formed integrally with the inner peripheral surface and extend radially inwardly therefrom. In the illustrated embodiment, six of such outer and inner tangs 22a and 22b, respectively are formed equidistantly about the diaphragm string 22. The function of the tangs 22a and 22b will be described in detail below.

The rearward end of the retainer 21 is disposed about a forward portion of a hollow cylindrical release sleeve 23. The retainer 21 may be retained on the sleeve 23 for axial movement therewith by a pair of snap rings 25 and 26 or similar devices. The snap ring 25 is located in a groove formed in the outer circumferential surface of the sleeve 23, while the snap ring 26 is located in a groove formed in the inner circumferential surface of the retainer 21. It will be appreciated that the retainer 21 and the sleeve 23 may be formed from a single piece of material. The sleeve 23 is connected to a conventional release bearing assembly, indicated generally at 27. It will also be appreciated that the sleeve 23 and a forwardly extending portion of the bearing assembly 27 may be formed from a single piece of material. The bearing assembly 27 is connected to a conventional shift fork assembly (not shown) which permits an operator to selectively axially move the bearing assembly 27, the sleeve 23, and the retainer 21 relative to the cover 11 so as to engage and disengage the clutch cover assembly 10, as is well known in the art.

Figure 3:
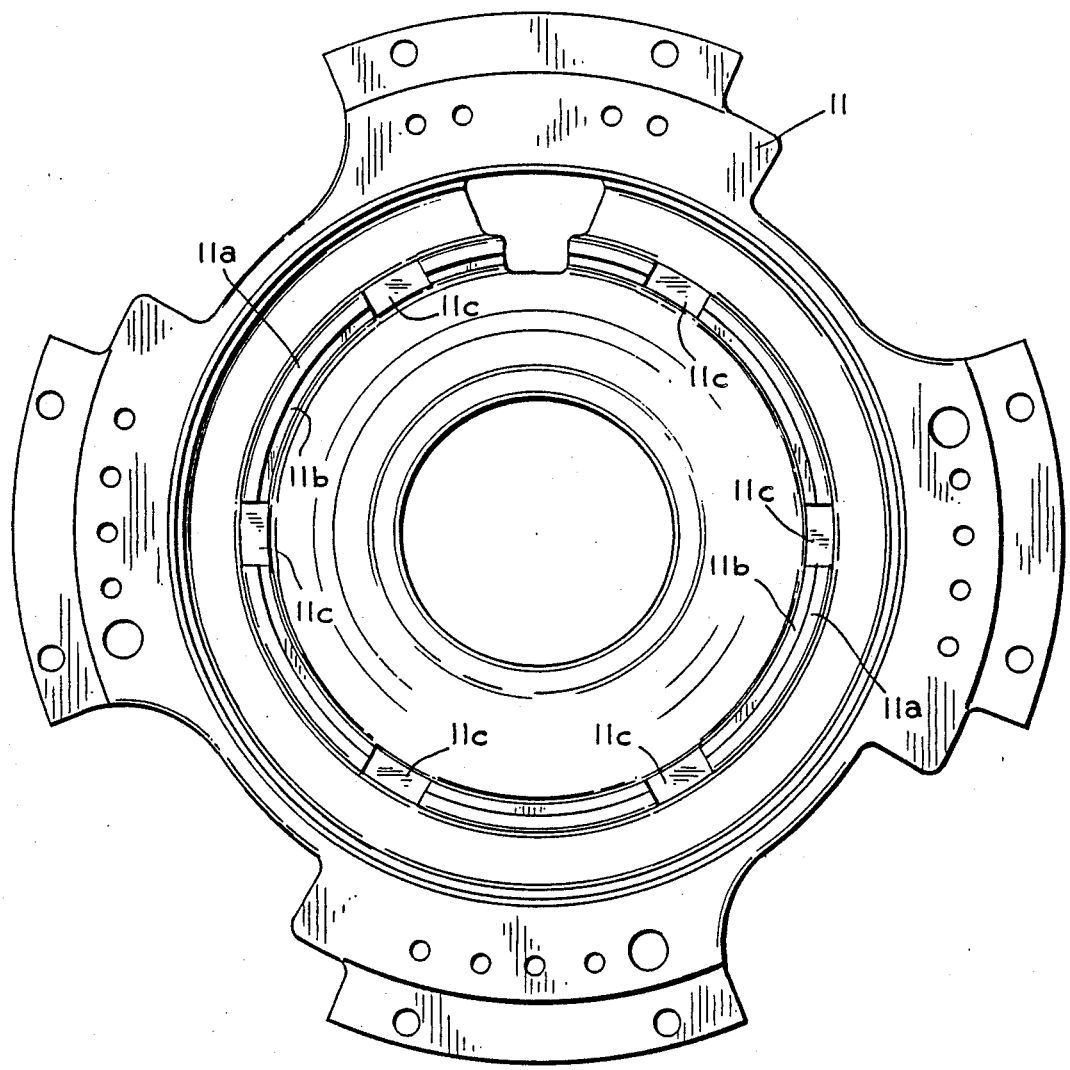
FIG. 3 a rearwardly facing end elevational view of the inner surface of the cover illustrated in FIGS. 1 and 2.

The structure of the cover 11 is best shown in FIGS. 2 and 3. As illustrated therein, the cover 11 has an annular shoulder 11a formed about the forwardly facing inner surface thereof. The shoulder 11a extends forwardly toward the pressure plate 12. A flat bearing surface 11b is formed into the radially innermost portion of the shoulder 11a. The bearing surface 11b is annular in shape, extending completely about the circumference of the shoulder 11a. The bearing surface 11b is angled relative to the longitudinal axis of the assembly 10 for a reason which will be explained in detail below. A plurality of slots 11c are formed through the shoulder 11a. The slots 11c are spaced equidistantly about the circumference of the shoulder 11a and extend radially outwardly from the bearing surface 11b through the shoulder 11a. The sizes, shapes, and locations of the slots 11c correspond to the outer tangs 22a formed on the diaphragm spring 22. Thus, when the diaphragm spring 22 is assembled onto the cover 11, the outer peripheral surface of the diaphragm spring 22 engages the radially outermost portion of the bearing surface 11b of the cover 11, as shown in the upper half of FIG. 2. As a result, the diaphragm spring 22 is piloted co-axially within the cover 11. Furthermore, the outer tangs 22a of the diaphragm spring 22 are received within corresponding slots 11c formed in the cover 11, as shown in the lower half of FIG. 2. Consequently, a driving connection is provided between the cover 11 and the diaphragm spring 22 which prevents relative rotational movement therebetween.

Figure 4:
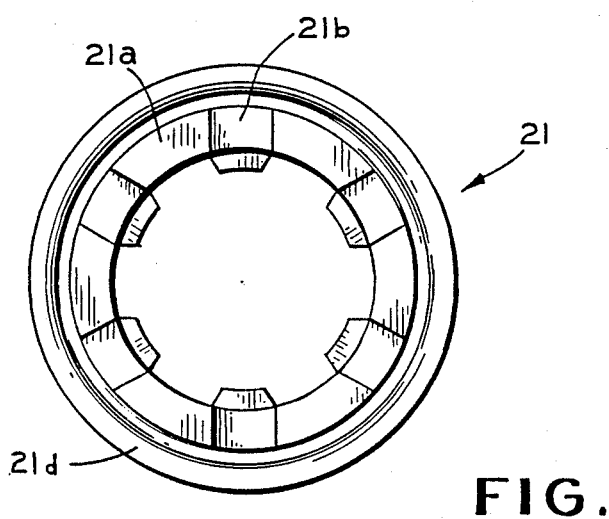
FIG. 4 is a forwardly facing end elevational view of the outer end surface of the release retainer illustrated in FIGS. 1 and 2.

The structure of the retainer 21 is best shown in FIGS. 2 and 4. As illustrated therein, the retainer 21 is generally hollow and cylindrical in shape. The rearwardly facing end of the retainer 21 terminates in a generally flat end surface 21a. A plurality of rearwardly facing recessed areas 21b are formed into the flat end surface 21a. The sizes, shapes, and locations of the recessed areas 21b correspond to the inner tangs 22b formed on the diaphragm spring 22. An annular rounded shoulder 21c is formed about the radially outermost portion of the retainer 21. The shoulder 21c also faces rearwardly toward the bearing assembly 27.

When the retainer 21 is assembled onto the diaphragm spring 22, the inner peripheral surface of the diaphragm spring 22 engages the rounded shoulder 21c formed on the retainer 21, as shown in the upper half of FIG. 2. As a result, the retainer 21 is piloted co-axially within the diaphragm spring 22. Furthermore, the inner tangs 22b of the diaphragm spring 22 are received within corresponding recessed areas 21b formed in the retainer 21, as shown in the lower half of FIG. 2. Consequently, a driving connection is provided between the retainer 21 and the diaphragm spring 22 which prevents relative rotational movement therebetween.

When the diaphragm spring 22 is compressed between the cover 11 and the retainer 21, as best shown in FIG. 2, it exerts a forwardly directed force against the retainer 21, urging it to move axially toward the pressure plate 12. The shoulder 21c bears the axial force generated by the diaphragm spring 22 when so compressed and functions as a fulcrum for the radially innermost ends of the levers 20. The urging of the diaphragm spring 22 causes the retainer 21 to move axially toward the pressure plate 12, causing the pressure plate 12 to frictionally engage a driven disc against a flywheel (neither shown) in a known manner.

When it is desired to disengage the clutch, the bearing assembly 27 is moved axially away from the pressure plate 12. As a result, the retainer 21 is moved axially therewith, causing the diaphragm spring 22 to be compressed or flattened, as shown in FIG. 2. The levers 20 are pivoted as the retainer 21 is moved, thereby permitting the pressure plate 12 to move axially away from the driven disc and the flywheel. Consequently, the driven disc is released from the frictional engagement described above.

When the diaphragm spring 22 is moved during use as described above, the outer peripheral edge thereof pivots about a flat knife-like edge defined between the shoulder 11a and the angled bearing surface 11b, as shown in the upper half of FIG. 2. The outer tangs 22a of the diaphragm spring 22 are free to move within the grooves 11c formed in the cover 11, as shown in the lower half of FIG. 2. Similarly, the inner peripheral edge of the diaphragm spring 22 pivots about the rounded shoulder 21c of the retainer, as shown in the upper half of FIG. 2, while the inner tangs 22 are free to move within the recessed areas 21b formed in the retainer 21, as shown in the lower half of FIG. 2.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A cover assembly for a diaphragm spring clutch comprising:
   a cover having an annular shoulder and a slot formed through said shoulder;
   a release retainer having an end surface and a recessed area formed into said end surface; and
   diaphragm spring means including an inner peripheral surface engaged with said end surface of said release retainer, an outer peripheral surface engaged with said shoulder of said cover, and at least one tang extending from each of said inner and outer peripheral surfaces, said inner tang extending into said recessed area of said release retainer and said outer tang extending into said slot of said cover for preventing relative rotational movement between said diaphragm spring, said release retainer, and said cover.

2. The invention defined in claim 1, wherein said cover includes a generally annular body portion, said annular shoulder being formed on an inner surface of said body portion, and a bearing surface is formed into said shoulder.

3. The invention defined in claim 2 wherein said slot is formed through said shoulder extending radially outwardly from said bearing surface.

4. The invention defined in claim 3 wherein a plurality of said slots are formed through said shoulder and a plurality of said tangs are formed on said outer peripheral surface of said diaphragm spring means.

5. The invention defined in claim 1 wherein said retainer includes a generally hollow cylindrical body portion having an end surface.

6. The invention defined in claim 5 wherein a plurality of said recessed areas are formed into said end surface and a plurality of said tangs are formed on said inner peripheral surface of said diaphragm spring means.

* * * * *